Sept. 4, 1956   C. B. CRAWFORD   2,761,704
TUBE COUPLING ADAPTED TO UPSET PIPE END
Filed Jan. 14, 1952
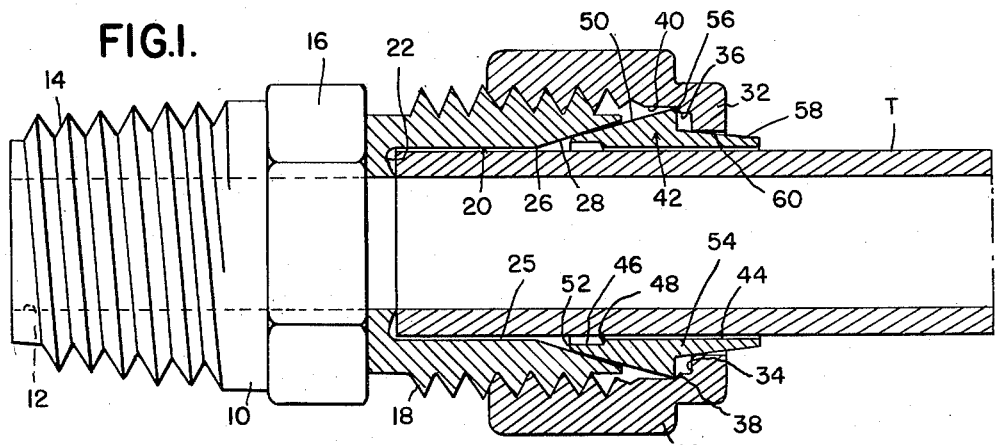
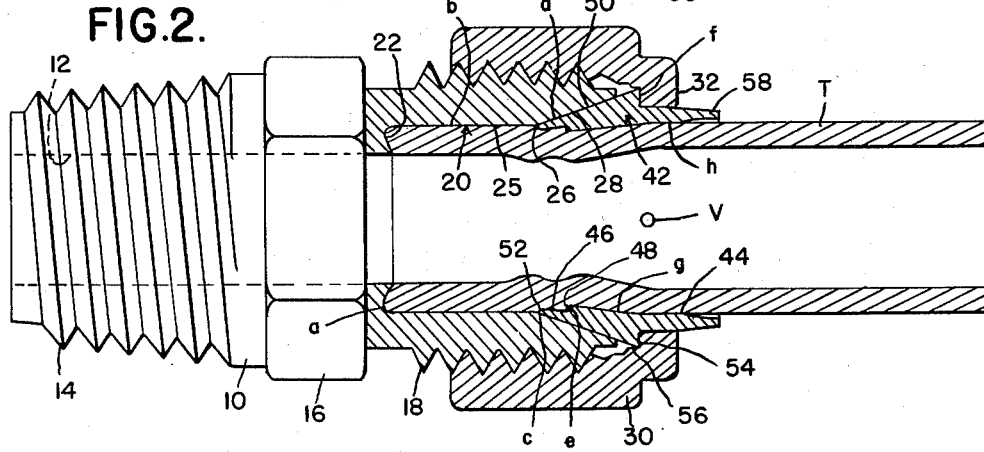
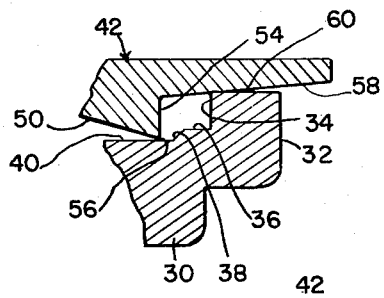
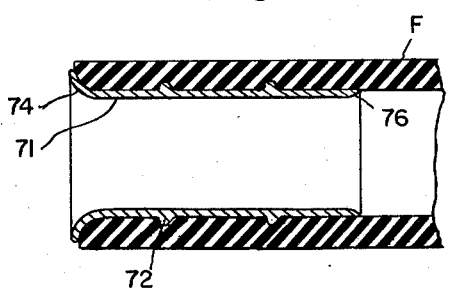
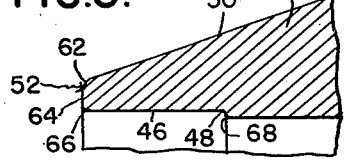
INVENTOR.
CULLEN B. CRAWFORD
BY Whittemore,
Hulbert & Belknap
ATTORNEYS

United States Patent Office 2,761,704
Patented Sept. 4, 1956

2,761,704

TUBE COUPLING ADAPTED TO UPSET PIPE END

Cullen B. Crawford, Cleveland, Ohio, assignor to Watts Electric & Mfg. Co., a corporation of Michigan Application January 14, 1952, Serial No. 266,321

8 Claims. (Cl. 285—331)

The present invention relates to a tube coupling.

It is a primary object of the present invention to provide a tube coupling which prevents weakening of the tube by thinning or cutting, and which in fact results in a thicker wall section of the tube at the zone in which it is most strongly gripped.

It is a further object of the present invention to provide a tube coupling designed to prevent destructive failure due to localized vibration.

It is a further object of the present invention to provide a tube coupling in which any internal spaces therein are adequately sealed to prevent entrance of moisture from condensation or other sources.

It is a further object of the present invention to provide a tube coupling which may be connected and disconnected repeatedly without affecting its efficiency.

It is a further object of the present invention to provide a tube coupling characterized by the provision of a tube seat engageable by the end of the tube, tube gripping means comprising a collet movable axially and radially inwardly with respect to the tube in conjunction with tube gripping and advancing means located in a position to produce, in conjunction with the tube seat, outward expansion of the entire end portion of the tube into contact with the interior surfaces of the fitting and an upsetting or thickening of the wall section of the tube, including that portion of the tube gripped as a result of inward deformation of the collet.

It is a feature of the present invention to provide a tube coupling in which forces are developed producing a flow of metal in the entire end portion of the tube with the result that the coupled end of the tube need not be specially treated to provide an accurately squared end.

Other objects and features of the invention will become apparent as the description proceeds, especially when taken in conjunction with the accompanying drawings, wherein:

Figure 1 is a side elevation partly in section showing the relationship between the tube and coupling elements prior to tightening of the elements.

Figure 2 is a view similar to Figure 1 showing the relationship of parts after the coupling elements have been tightened.

Figure 3 is a fragmentary enlarged section showing the detailed shape of cooperating portions of the nut and collet employed in the coupling.

Figure 4 is a longitudinal sectional view through the end portion of a reinforced flexible tube.

Figure 5 is a fragmentary enlarged section of the nose end of the collet.

Referring first to Figure 1 the tube coupling comprises three elements. The first of the elements is a body 10 of generally tubular form having an opening therethrough as indicated by the reference numeral 12. The body is indicated as provided at one end with a tapered thread 14 and provided intermediate its ends with a polygonal portion 16 by means of which it may be retained against rotation by a wrench or the like. The other end of the body is exteriorly threaded as indicated at 18 and is provided with a circumferential enlargement indicated generally at 20. This enlargement extends inwardly from one end of the body and terminates at its inner end in a seat 22 adapted to receive and cooperate with the end of the tube T in a particular way. As seen in Figure 1, the seat 22 is of concavely curved transverse cross-section and this cross-section is disposed to establish forces tending to cause radially outward expansion of the tube. This is the result of forming the seat so that it is generally inclined from the axis of the body. Thus, lines perpendicular to the surface of the seat are inclined outwardly of the body, and as a result, the reaction on the end portion of the tube as the tube is forced against the seat is to tend to cause the material of the tube adjacent its end to expand radially outwardly.

The seat 22 is shaped to produce a controlled flow of metal and to prevent stacking, or irregular, uncontrolled piling up of metal, which would occur if a conical seat were employed. While the concavely curved seat illustrated in Figure 1 is preferred, similar results with avoidance of stacking are obtained when the seat is convexly curved in transverse cross-section. The major portion of the seat is shaped such that its transverse cross-section conforms closely to an arc having a radius not exceeding five times the wall thickness of the tube for which the fitting is designed. As a result of the curved, and preferably concavely curved, tube seat a controlled flow of the material of the tube is obtained in a manner which results in outward expansion of the entire end portion of the tube into engagement with the interior surfaces of the coupling as well as a thickening or upsetting of the wall of the end portion of the tubing which is extended from the end of the tubing to a point located beyond the engagement between the tube and the portions of the collet which are most deeply embedded therein.

Outwardly of the seat 22 the enlargement 20 is of cylindrical shape as indicated at 25, to a point 26 where it changes to an outwardly flared conical surface 28 which extends completely to the outer end of the enlargement 20. The internal diameter of the cylindrical portion of the enlargement 20 is designed to be slightly over-size with respect to the external diameter of the tube T. In a typical case where the tube is ⅜" in outside diameter, the cylindrical portion of the enlargement 20 is approximately .015" over-size with respect to the tube.

Associated with the body 10 is a nut 30 which is internally threaded to cooperate with the threads 18 on the body. In addition the nut has an inwardly extending flange portion 32.

As best seen in detail in Figure 3, the inner surface of the flange portion 32 of the nut includes a flat abutment surface 34 extending to a cylindrical surface 36 which in turn connects to an inclined conical surface 38, the outside of which connects to a second cylindrical surface 40.

A collet 42 is provided for effecting engagement with the tube T. The collet is of generally tubular shape and is provided with a cylindrical opening 44 which extends therethrough and which is slightly larger than the outside diameter of the tube T. Adjacent the inner or nose end of the collet the inside diameter is enlarged as indicated at 46 thereby providing a shoulder or corner 48 located inwardly from the nose end of the collet. In practice, the enlargement 46 is just slightly larger than the interior diameter of the collet. In a typical case where the fitting is designed for a ⅜" tube, excellent results have been obtained when the enlargement 46 has a diameter approximately .020" greater than the diameter of the cylindrical opening 44. At its nose end the collet 42 is provided with a conical tapered nose having an outer surface 50 and the surface 50 at the extreme nose end of the collet is slightly curved as indicated at 52 where it merges with the interior surface of the enlargement 46. Both the shoulder 48 and the intersection between the surface of the enlargement 46 and the curved exterior surface 52 of the nose of the collet are slightly rounded. This rounding is just sufficient to prevent the corner provided by the shoulder and by the intersection between the inner and outer surfaces at the nose end of the collet from operating as cutting edges. As will subsequently be described, these rounded corners therefore operate to cause a flow or extrusion of metal in the tube as contrasted with a cutting action in which a cut surface would be formed in the tube.

The tapered nose of the collet is terminated to provide a radially extending shoulder 54 which cooperates with the flange portion 32 of the nut, as will now be described.

Referring again to Figure 3, the conical surface 50 of the collet intersects the radial surface of the shoulder 54 as indicated at 56. The internal diameter of the cylindrical surface 40 of the nut is designed to equal the external diameter of the conical surface 50 at its intersection with the radial surface 54. Accordingly, as seen in Figure 3, the cylindrical surface 40 of the nut fits closely to the maximum outside diameter of the nose of the collet 42. As the nut is drawn to the left, as seen in Figure 3, by the inter-action between its threads and the threaded portion 18 of the body, the inclined or conical surface 38 of the nut engages the corner 56 on the collet and acts as a camming surface to cam the material of the collet radially inwardly. In a specific example where the fitting has been designed for a ⅜" tube, the conical surface 38 of the nut extends at an angle of approximately 45 degrees and the internal diameter of the cylindrical surface 36 is about .030" less than the internal diameter of the cylindrical surface 40. The corner 56 if desired, may be flattened to correspond to the slope of the surface 38.

Rearwardly of its shoulder 54, the collet 42 is provided with a tapered sleeve portion 58. The outside diameter of the sleeve portion 58 decreases from the shoulder 54 to the end of the collet and the cone angle of this tapered sleeve is very small. Excellent results have been obtained when an included cone angle of about 4 degrees is provided on the sleeve 58 although this angle may be increased to as much as 20 degrees. The internal diameter of the flange surface 60 is equal to the outside diameter of the sleeve 58 at a point approximately midway between the ends of the sleeve and its surface is cylindrical, thus restricting the area of contact between the inner surface 60 of the flange and the outer surface of the sleeve. Accordingly, as the nut 30 is drawn up to engage the collet 42, the flange 32 engages the tapered sleeve 58 and further movement of the nut compresses the material of the sleeve inwardly toward the tube T.

When the nut 30 is rotated to move the same to the left from the position illustrated in Figure 1 to its final position as illustrated in Figure 2, a number of actions take place. In the first place, the flange 32 of the nut compresses the sleeve 58 of the collet inwardly into tight contact with the tube as the flange of the nut approaches the shoulder 54 of the collet. Due to the small cone angle of the sleeve, relatively great radial forces are developed, and the inwardly deformed sleeve portion grips the tube very strongly. As the corner 56 of the collet engages the inclined surface 38 on the nut, the material of the collet is further compressed inwardly so as to bring it into engagement with the outer surface of the tube T. The amount of compression resulting depends of course upon the difference in internal diameter between the cylindrical surfaces 46 and 40 of the nut but is sufficient to cause the collet to grip the tube firmly. The corner 56 of the collet engages the cylindrical surface 36 of the nut and the nut moves further to the left without further compression of the tapered nose portion of the collet. However, the conical external surface of the sleeve 58 of the collet results in a further inward compression of this portion of the collet during movement of the nut to its next position in which the shoulder 36 thereof engages the shoulder 54 of the collet.

The conical surface 50 of the collet has a smaller included cone angle than the outwardly flaring conical surface 28 of the body. In a specific example which has operated with perfect satisfaction, this included cone angle may differ by approximately 12 degrees, the included cone angle of the outwardly flared surface 28 being approximately 36 degrees and the included cone angle of of the conical surface 50 of the collet being approximately 24 degrees.

As a result of this difference in cone angle, movement of the collet 42 to the left from the position shown in Figure 1 to the position shown in Figure 2 provides an inward compressive action on the collet which is progressive from its nose and toward its sleeve end. Due to the provision of the enlargement 46 at the nose end of the collet, the first action which takes place is a bending inwardly of the extreme nose portion of the collet. However, when the inner end of the collet engages the metal of the tube it results in a flow of metal rather than the removal of a chip or any cutting action.

Referring now to Figure 5 there is illustrated a fragmentary enlarged section of the nose end of the collet 42. As seen in this figure, the conical surface 50 of the collet is connected by a rounded surface 62 to a flat surface 64 which occupies a plane perpendicular to the axis of the collet. The annular surface 64 may be quite small but preferably should have a radial dimension of at least .005". The surface 64 is connected to the inner cylindrical surface of the enlargement 46 by a rounded surface 66. In Figure 5 the rounded corner of the shoulder 48 is indicated at 68. In order that the collet will have the required action with the tube, or in other words, so that the metal will flow around the rounded corners provided on the tube engaging portions of the collet, it is of course essential for the material of the collet to be harder than the material of the tube. Accordingly, as the metal of the end portion of the tube is upset due to the forward movement of the collet into the body, the metal of the tube flows smoothly around the rounded corners 66 and 68 of the collet and conforms itself smoothly to the inner surface of the collet.

Due to the rounded form of the shoulder or corner 48, cutting is also prevented at this point. Further advance of the nut forces the tube strongly against the seat 22 with the result that the material at the end of the tube fills the transverse concavity of the seat. Due to the general inclination of the seat, forces developed by movement of the tube to the left causes radial outward movement of the material of the tube adjacent its end into contact with the cylindrical surface 25 of the enlargement 20. Further movement of the collet, and of the tube, results in upsetting material of the tube, thus thickening the wall. Since the tube is strongly gripped by the inwardly compressed sleeve 58, and by the portions of the collet in the vicinity of the corner 56, this upsetting extends from the end of the tube beyond the zone of the nose of the collet and the shoulder 48. At the same time this outward radial movement and upsetting of the end portion of the tube cooperates with the radial inward movement of the collet to cause the collet to become embedded in the material of the tube, as illustrated in Figure 2. This is accomplished, as previously described, without any cutting action being allowed to take place so that the material of the tube is not weakened. This is one of the most important features of the present invention and it is found that the tube when gripped by the coupling disclosed herein is in no sense weakened. The action of the collet may be considered primarily as a gripping action resulting from inward contraction of the collet and outward expansion and upsetting of the tube combined with a flow of metal resulting from movement of the collet to the left relative to the tube, this action being equivalent to a burnishing or beading operation in which the metal flows as in extrusion without anything equivalent to a cutting action taking place.

Inasmuch as the corners moving in contact with the outer surface of the tube T are rounded, so that no cutting action takes place, it is possible to provide for a relatively greater movement of the collet 42 with reference to the tube T than has heretofore been employed. Thus, it is contemplated that more than ⅛" of relative travel may be provided.

When the coupling is tightened, as illustrated in Figure 2, a plurality of independent seals are provided. Thus, a seal is provided at $a$ where the end of the tube is deformed to fit into the seat 22 provided at the inner end of the enlargement 20. Moreover, due to outward radial expansion of the tube a seal as indicated at $b$ is provided throughout the zone of the cylindrical portion 25 of the enlargement 20 of the body 10. A third seal as indicated at $c$ is provided at the nose end 52 of the collet 42, this seal resulting from the combination of outward expansion of the tube T and inwardly and longitudinal slanting movement of the collet. A fourth seal as indicated at $d$ is provided between the outer conical surface 50 of the collet and the inner conical surface 28 of the body. This seal as previously indicated, is extended progressively from the nose end of the collet rearwardly as a result of the difference in the included cone angles between these surfaces. A fifth sealing point is indicated at $e$ as established by the shoulder 48 in the collet. A sixth seal is indicated at $f$ between the radial surface or shoulder 34 on the flange 32 of the nut and the surface 54 of the collet. A seventh sealing area is indicated at $g$ between the internal diameter of the collet and the outside diameter of the tube, resulting from the combination of outward expansion of the tube and inward compression of the collet. An eighth seal is indicated at $h$ where the sleeve 58 has been compressed against the tube.

In the completed assembly the focal point of high frequency vibration occurs approximately at a zone indicated by the circle designated V in Figure 2. It will be observed that at this point the tube is not weakened in any manner. This is to be contrasted with some prior constructions in which the focal point of high frequency vibration is localized at a point in which the tube is weakened by the application of the coupling elements. It has been found in the past that tube failure is directly traceable in many cases to the effect of high frequency vibration localized at a zone or area in the tube already weakened by the application of the coupling. Moreover, the entire end portion of the tube is gripped from its extreme end to a point intermediate the ends of the sleeve 58, so that destructive vibration is effectively prevented.

Important advantages in the present fitting result from the action of the fitting in establishing a sealed connection with a tube. One of the important features is the fact that the rear portion of the collet including the inner end of its sleeve 58 and the portion thereof located adjacent the plane containing the corner 56 thereof is compressed into firm gripping relation with the tube by the action of the nut 32. Accordingly, as the collet is thereafter moved forwardly by the nut, the inner portion of the tube is upset as a result of the pressure transmitted to the seat 22. Due to the inclination of the seat forces are developed having an outward component which expands the end of the tube outwardly in addition to the increase in the wall thickness thereof due to upsetting. It is important to note that the increased wall thickness due to upsetting extends rearwardly of the inner end of the nose of the collet and inwardly of the shoulder 48. Thus, while an inward component of motion is imparted to the inner end of the collet and to the shoulder 48 thereof, the upsetting action increases the wall thickness of the tube at these points and counteracts any tendency to reduce the strength of the tube at these points.

An important feature of the present invention is that when the nut has been tightened to force the collet into the body and the inner end of the tube seated and expanded as described in the foregoing, no open spaces are left between the collet and the tubing or between the collet and the body. Moreover, the flange on the nut is firmly sealed against the sleeve on the collet. As a result it is impossible for moisture from condensation being trapped within the coupling. This has been a prime source of trouble in prior couplings, particularly where employed under low temperature conditions. The present construction avoids these difficulties and therefore renders the coupling particularly useful in aircraft and refrigeration industries.

The embodiment of the invention which has been chosen for illustration is a male connector. The invention is applicable to all types of fittings, and when formed as a union, which involves a duplication of the structure shown at the right of Figure 1, it may be employed for connecting tubes or pipes. This leads to an important application of the present invention in the coupling of tubes or pipes of plastic material. As so used, it avoids cutting or scoring of the outer surface or skin of the tube or pipe, and thus preserves its full strength.

The tube coupling disclosed herein is well suited for use with tubes of widely differing materials. While the action of the coupling has so far been described primarily in conjunction with metal tubing, the action is the same with flexible tubing such for example as reinforced rubber tubing. If the reinforced rubber tubing includes adequate internal reinforcement, the coupling may be employed directly with the tubing. However, in some cases the flexible tubing may lack sufficient integral reinforcement in which case it may be reinforced as illustrated in Figure 4. In this figure a flexible tube F is illustrated. It will be understood that this tube includes some internal reinforcement which is not illustrated, but the internal reinforcement is not sufficiently strong to permit use of the flexible tubing in the tube coupling. In such case a special internal reinforcing member 71 is provided, which as illustrated herein, is of generally tubular shape having external annular ribs 72 and an outwardly flared end portion 74. At its inner end the inner surface of the member 71 is outwardly flared as indicated at 76, thus providing an arrangement which tends to prevent fluid under pressure from forcing its way between the flexible tube F and the reinforcing member 71.

The member 71 permits the end portion of the tube F to cooperate with the tube coupling in precisely the same manner as described in the foregoing. In this case it is important to note that the provision of the rounded corners at 66 and 68 on the collet are of the most critical importance, since the provision of a cutting edge or edges at these points would destroy the efficiency of the tubing.

An important feature of the present invention is that the design of the parts is such as to prevent accidental assembly of the tube coupling with the collet reversed. In many standard tube couplings it is possible for a careless workman to insert an interior element of the coupling in reverse position, in which case the coupling does not operate when the nut is tightened. The fact that an improper joint has thus been made may not be readily apparent and subsequent failure of the system may be difficult to trace.

In the present case the sleeve 58 is sufficiently long so that if the collet is reversed, the flange 32 of the nut engages the conical surface 50 of the collet before the threaded portion of the nut can reach the threaded portion of the body. Thus, it is physically impossible to produce an imperfect seal if the nut is actually threaded onto the body with the collet in place.

The present tube coupling may be connected and disconnected repeatedly and will continue to produce a perfect seal connection each time it is used. Where the tube coupling is employed with metal tubing, disassembly of the coupling will leave the collet 42 retained in place on the tube but due to the resilience of the material from which the collet is formed it is found that the collet is sufficiently loose on the tube after disassembly to permit its being turned relative thereto.

Obviously, the specific materials of the tube coupling will be selected in accordance with the materials of the tubes or tubing for which it is designed. The collet may in proper cases be formed from a suitable plastic, relatively soft metals such as brass or aluminum, or relatively hard metals such as stainless steel. However, as previously indicated, the material of the collet must in all cases be harder than the material of the tube.

After the forces developed by the thrust of the radial surfaces of the collet against the metal of the tube cause the radially outward expansion of the end portion of the tube to engage with the interior of the chamber, additional movement of the collet results in upsetting of the metal and a counter-flow of metal around the radial surfaces. The rounded corners of these radial surfaces prevent cutting of the material of the tube and permit a smooth counter-flow of material around these corners which may be likened to the flow of metal around die surfaces in tube drawing operations or the plastic flow of metal in metal extrusion.

The present invention relates to new principles of obtaining a novel and improved seal and support for a tube end. The invention is illustrated with a particular type of fitting but it will of course be obvious that the invention may be practiced with widely different types of fittings wherever the problem is presented of establishing a connection to the end of a tube. Thus, the invention may be embodied in couplings adapted to connect adjacent ends of tube sections or it may be practiced in the connection of a tube end to a body of any type, such for example as in the connection of a tube to a valve body or the like.

The drawings and the foregoing specification constitute a description of the improved tube coupling in such full, clear, concise and exact terms as to enable any person skilled in the art to practice the invention, the scope of which is indicated by the appended claims.

What I claim as my invention is:

1. A tube fitting comprising a body having an externally threaded portion and a passage extending through said threaded portion, the passage being radially enlarged inwardly from the end of said threaded portion to receive the end of a soft metal tube, the inner end of said enlarged portion being shaped to form a seat for engaging the end of such tube, said seat in radial cross-section being inclined to face outwardly at a small angle from the axis of the passage and being curved in such cross-section, the enlarged portion of said passage next adjacent said seat being cylindrical and dimensioned to closely surround the end portion of a tube received therein, the portion of said passage outwardly of said cylindrical portions being conically enlarged, a collet having a conical portion at its inner end received in the conical enlargement of said passage and having an outwardly facing radial abutment surface, said collet having an outwardly extending, radially inwardly tapered sleeve, a nut on the threaded portion of said body having a flange engaging the radial surface of said collet to force said collet inwardly of the conical enlargement of said passage, the inner edge of said flange engaging said sleeve intermediate the ends thereof to compress said sleeve radially inwardly into frictional engagement with a tube prior to engagement between said flange and the outwardly facing abutment surface of said collet, said conical enlargement of said passage compressing said collet radially inwardly as it is forced axially inwardly of said conical enlargement, said collet having an opening therethrough to receive the end portion of a tube inserted therein, the inner end of said collet having a generally radial abutment surface the circular corner between said last recited abutment surface and the opening therethrough being slightly rounded to avoid cutting the tube material, the material of said collet being relatively hard as compared to the material of the tube.

2. A tube fitting comprising a body having an externally threaded portion and a passage extending through said threaded portion, the passage being radially enlarged inwardly from the end of said threaded portion to receive the end of a soft metal tube, the inner end of said enlarged portion being shaped to form a seat for engaging the end of such tube, said seat in radial cross-section being inclined to face outwardly at a small angle from the axis of the passage and being curved in such cross-section, the enlarged portion of said passage next adjacent said seat being cylindrical and dimensioned to closely surround the end portion of a tube received therein, the portion of said passage outwardly of said cylindrical portions being conically enlarged, a collet having a conical portion at its inner end received in the conical enlargement of said passage and having an outwardly facing radial abutment surface, a nut on the threaded portion of said body having a flange engaging the radial surface of said collet to force said collet inwardly of the conical enlargement of said passage, said nut having a conical camming surface engageable with the circular corner of the collet defined by the intersection between the conical inner end portions and the outwardly facing radial abutment surface thereof to compress the collet radially inwardly into frictional contact with a tube therein prior to engagement between the flange of said nut and the outwardly facing radial abutment surface of said collet, said conical enlargement of said passage compressing said collet radially inwardly as it is forced axially inwardly of said conical enlargement, said collet having an opening therethrough to receive the end portion of a tube inserted therein, the inner end of said collet having a generally radial abutment surface the circular corner between said last recited abutment surface and the opening therethrough being slightly rounded to avoid cutting the tube material, the material of said collet being reltaively hard as compared to the material of the tube.

3. A tube fitting comprising a body having an externally threaded portion and a passage extending through said threaded portion, the passage being radially enlarged inwardly from the end of said threaded portion to receive the end of a soft metal tube, the inner end of said enlarged portion being shaped to form a seat for engaging the end of such tube, said seat in radial cross-section being inclined to face outwardly at a small angle from the axis of the passage and being curved in such cross-section, the enlarged portion of said passage next adjacent said seat being cylindrical and dimensioned to closely surround the end portion of a tube received therein, the portion of said passage outwardly of said cylindrical portion being conically enlarged, a collet having a conical portion at its inner end received in the conical enlargement of said passage and having an outwardly facing radial abutment surface, a nut on the threaded portion of said body having a flange engaging the radial surface of said collet to force said collet inwardly of the conical enlargement of said passage, said conical enlargement of said passage compressing said collet radially inwardly as it is forced axially inwardly of said conical enlargement, said collet having an opening therethrough to receive the end portion of a tube inserted therein, the inner end of said collet having a continuous, annular, generally radial abutment surface, the circular corner between said last recited abutment surface and the opening therethrough being slightly rounded to avoid cutting the tube material, said collet being formed of a material which is relatively hard as compared to the material of the tube, the inner end of said collet when said fitting is assembled, being located substantially at the outer end of the cylindrical portion of the passage through said body, the portion of the tube between said seat and the inner end of said collet being upset by axially directed forces applied thereto by said seat and said collet to completely fill the cylindrical portion of said passage.

4. A fitting as defined in claim 3 in which the opening through said collet is slightly enlarged inwardly from its inner end and has at the outer end of such enlargement a circular shoulder, the corner between said shoulder and the opening through said collet being slightly rounded to avoid cutting the tube material.

5. A tube fitting comprising a body having an externally threaded portion and a passage extending through said threaded portion, the passage being radially enlarged inwardly from the end of said threaded portion to receive the end of a soft metal tube, the inner end of said enlarged portion being shaped to form a seat for engaging the end of such tube, said seat in radial cross-section being inclined to face outwardly at a small angle from the axis of the passage and being curved in such cross-section, the enlarged portion of said passage next adjacent said seat being cylindrical and dimensioned to closely surround the end portion of a tube received therein, a collet having an opening therethrough and being movable axially in said enlarged portions of said passage, the inner end of said collet having a continuous, annular, generally radial abutment surface, the circular corner between said last recited abutment surface and the opening therethrough being slightly rounded to avoid cutting the tube material, means for forcing said collet inwardly of said passage and for compressing said collet radially inwardly to engage a tube therein to force the end of said tube against said seat to upset the material at the end portions of the tube and to thicken and expand the end portions of the tube into sealing engagement with the cylindrical portion of the enlargement of said passage, said collet being formed of a material which is relatively hard as compared to the material if the tube, the inner end of said collet when said fitting is assembled, being located substantially at the outer end of the cylindrical portion of the passage through said body, the portion of the tube between said seat and the inner end of said collet being upset by axially directed forces applied thereto by said seat and said collet to completely fill the cylindrical portion of said passage.

6. A tube fitting as defined in claim 5 in which the opening through said collet is slightly enlarged inwardly from its inner end and has at the outer end of such enlargement a circular shoulder, the corner between said shoulder and the opening through said collet being slightly rounded to avoid cutting the tube material.

7. A tube fitting comprising a body having an externally threaded portion and a passage extending through said threaded portion, the passage being radially enlarged inwardly from the end of said threaded portion to receive the end of a soft metal tube, the inner end of said enlarged portion being shaped to form a seat for engaging the end of such tube, said seat in radial cross-section being inclined to face outwardly at a small angle from the axis of the passage and being concavely curved in such cross-section, the enlarged portion of said passage next adjacent said seat being cylindrical and dimensioned to closely surround the end portion of a tube received therein, the portion of said passage outwardly of said cylindrical portion being conically enlarged, a collet having a conical portion at its inner end received in the conical enlargement of said passage and having an outwardly facing radial abutment surface, a nut on the threaded portion of said body having a flange engaging the radial surface of said collet to force said collet inwardly of the conical enlargement of said passage, said conical enlargement of said passage compressing said collet radially inwardly as it is forced axially inwardly of said conical enlargement, said collet having an opening therethrough to receive the end portion of a tube inserted therein, the inner end of said collet having a continuous, annular, generally radial abutment surface, the circular corner between said last recited abutment surface and the opening therethrough being slightly rounded to avoid cutting the tube material, said collet being formed of a material which is relatively hard as compared to the material of the tube, the inner end of said collet when said fitting is assembled, being located substantially at the outer end of the cylindrical portion of the passage through said body, the portion of the tube between said seat and the inner end of said collet being upset by axially directed forces applied thereto by said seat and said collet to completely fill the cylindrical portion of said passage.

8. A tube fitting comprising a body having an externally threaded portion and a passage extending through said threaded portion, the passage being radially enlarged inwardly from the end of said threaded portion to receive the end of a soft metal tube, the inner end of said enlarged portion being shaped to form a seat for engaging the end of such tube, said seat in radial cross-section being inclined to face outwardly at a small angle from the axis of the passage and being concavely curved in such cross-section, the radius of such concave curvature being not more than five times the wall thickness of the tube for which the fitting is designed, the enlarged portion of said passage next adjacent said seat being cylindrical and dimensioned to closely surround the end portion of a tube received therein, the portion of said passage outwardly of said cylindrical portion being conically enlarged, a collet having a conical portion at its inner end received in the conical enlargement of said passage and having an outwardly facing radial abutment surface, a nut on the threaded portion of said body having a flange engaging the radial surface of said collet to force said collet inwardly of the conical enlargement of said passage, said conical enlargement of said passage compressing said collet radially inwardly as it is forced axially inwardly of said conical enlargement, said collet having an opening therethrough to receive the end portion of a tube inserted therein, the inner end of said collet having a continuous, annular, generally radial abutment surface, the circular corner between said last recited abutment surface and the opening therethrough being slightly rounded to avoid cutting the tube material, said collet being formed of a material which is relatively hard as compared to the material of the tube, the inner end of said collet when said fitting is assembled, being located substantially at the outer end of the cylindrical portion of the passage through said body, the portion of the tube between said seat and the inner end of said collet being upset by axially directed forces applied thereto by said seat and said collet to completely fill the cylindrical portion of said passage.

References Cited in the file of this patent

UNITED STATES PATENTS

| | | |
|---|---|---|
| 2,211,856 | Kreidel | Aug. 20, 1940 |
| 2,450,314 | Vandervoort | Sept. 28, 1948 |
| 2,522,785 | Hanson | Sept. 19, 1950 |
| 2,544,108 | Richardson | Mar. 6, 1951 |
| 2,554,585 | Miller | May 29, 1951 |
| 2,613,959 | Richardson | Oct. 14, 1952 |